US009031994B1

United States Patent
Cao et al.

(10) Patent No.: US 9,031,994 B1
(45) Date of Patent: May 12, 2015

(54) DATABASE PARTITIONING FOR DATA PROCESSING SYSTEM

(71) Applicant: EMC Corporation, Hopkinton, MA (US)

(72) Inventors: Yu Cao, Beijing (CN); Xiaoyan Guo, Beijing (CN); Stephen Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 379 days.

(21) Appl. No.: 13/727,738

(22) Filed: Dec. 27, 2012

(51) Int. Cl.
G06F 7/00 (2006.01)
G06F 17/30 (2006.01)

(52) U.S. Cl.
CPC .... G06F 17/30958 (2013.01); G06F 17/30584 (2013.01)

(58) Field of Classification Search
CPC .................................................. G06F 17/30584
See application file for complete search history.

(56) References Cited

U.S. PATENT DOCUMENTS

2004/0177245 A1* 9/2004 Murphy ........................ 713/100

OTHER PUBLICATIONS

C. Curino et al., "Schism: a Workload-Driven Approach to Database Replication and Partitioning," Proceedings of the Very Large Databases (VLDB) Endowment, Sep. 2010, pp. 48-57, vol. 3, No. 1.
G. Decandia et al., "Dynamo: Amazon's Highly Available Key-Value Store," Proceedings of the 21st ACM SIGOPS Symposium on Operating Systems Principles (SOSP), Oct. 2007, pp. 205-220, vol. 41, No. 6.
D. Dewitt et al., "Parallel Database Systems: The Future of High Performance Database Systems," Communications of the ACM, Jun. 1992, pp. 85-98, vol. 35, No. 6.
X. Guo et al., "PEACOD: A Platform for Evaluation and Comparison of Database Partitioning Schemes," Proceedings of the 17th International Conference on Database Systems for Advanced Applications (DASFAA), Part II, Lecture Notes in Computer Science (LNCS), Apr. 2012, pp. 304-308, vol. 7239, Busan, South Korea.
A. Pavlo et al., "Skew-Aware Automatic Database Partitioning in Shared-Nothing, Parallel OLTP Systems," Proceedings of the ACM SIGMOD International Conference on Management of Data, May 2012, pp. 61-72.
J.M. Pujol et al., "Scaling Online Social Networks Without Pains," NetDB, International Workshop on Networking Meets Databases, Oct. 2009, 7 pages.

* cited by examiner

*Primary Examiner* — Ajith Jacob
(74) *Attorney, Agent, or Firm* — Ryan, Mason & Lewis, LLP (57) ABSTRACT

Techniques for improved partitioning of a database for distribution in a data processing system. In one example, a method comprises the following steps. A database and a workload set associated with the database are analyzed. A hyper-graph is generated based on the analysis of the database and the workload set. The hyper-graph is partitioned into a partitioned hyper-graph. The partitioned hyper-graph is evaluated based on one or more partitioning constraints and/or one or more partitioning effect metrics. The partitioned hyper-graph is repartitioned when warranted by the evaluation step. A mapping is generated based on the partitioned hyper-graph that assigns at least one or more portions of the database to one or more nodes of a data processing system. The analyzing, hyper-graph generating, partitioning, evaluating, repartitioning and mapping generation steps are executed via at least one processor device.

20 Claims, 6 Drawing Sheets

TABLE $T1 = a$     $T2 = b$ tg1  $a > 1$       tg4  $b > 10$
tg2  $0 < a \leq 1$   tg5  $b = 5$
tg3  $a < 0$         tg6  $b < 5$
                     tg7  $5 < b < 10$

QUERY $Q_1 = a \leq 1$ AND $b = 5$
$Q_2 = a > 0$ AND $b < 5$
$Q_3 = a > 1$ AND $b > 10$
$Q_4 = a < 0$ AND $b < 10$

HYPER-GRAPH GENERATED
702

HYPER-GRAPH PARTITIONING
SUB1 / SUB2
704

SUBGRAPHS THAT ARE PARTITIONED
706

DATABASE PARTITIONING FOR DATA PROCESSING SYSTEM

FIELD

The field relates to data processing systems, and more particularly to techniques for partitioning a database for distribution in a data processing system.

BACKGROUND

Online Transaction Processing (OLTP) database systems are among the most widely deployed data processing systems in use by enterprises today. With the explosive growth of OLTP database systems and their user populations, scalability issues have become the major obstacle to the systems for achieving high transaction throughput. One common approach to scaling these OLTP database systems is to partition the database and workload across a cluster of commodity, non-sharing servers (nodes) that are managed by a parallel or distributed database management system (DBMS), e.g., Greenplum® Database available from EMC Corporation of Hopkinton, Mass.

In practice, the scalability of these OLTP applications adopting the partitioning technique usually depends on an optimal database partitioning scheme, which defines how an application's data and workload is partitioned across nodes in the cluster, and how queries and transactions are routed to nodes. Without a proper design, a DBMS will perform no better than a single-node system due to the overhead caused by blocking, inter-node communication, and load balancing issues, that result from the distributed transactions and data and workload skew. However, designing an optimal database partitioning scheme for OLTP applications is known to be difficult.

SUMMARY

Embodiments of the invention provide techniques for improved partitioning of a database for distribution in a data processing system.

In one embodiment, a method comprises the following steps. A database and a workload set associated with the database are analyzed. A hyper-graph is generated based on the analysis of the database and the workload set. The hyper-graph is partitioned into a partitioned hyper-graph. The partitioned hyper-graph is evaluated based on at least one of one or more partitioning constraints and one or more partitioning effect metrics. The partitioned hyper-graph is repartitioned when warranted by the evaluation step. A mapping is generated based on the partitioned hyper-graph that assigns at least one or more portions of the database to one or more nodes of a data processing system. The analyzing, hyper-graph generating, partitioning, evaluating, repartitioning and mapping generation steps are executed via at least one processor device.

In another embodiment, a computer program product is provided which comprises a processor-readable storage medium having encoded therein executable code of one or more software programs. The one or more software programs when executed by the at least one processor device implement steps of the above-described method.

In yet another embodiment, an apparatus comprises a memory and at least one processor device operatively coupled to the memory and configured to perform steps of the above-described method.

In a further embodiment, an online transaction processing database system comprises a database, one or more nodes, and a database partitioning engine coupled to the one or more nodes and configured to determine a distribution of the database across the one or more nodes. The database partitioning engine analyzes the database and a workload set associated with the database, generates a hyper-graph based on the analysis of the database and the workload set, partitions the hyper-graph into a partitioned hyper-graph, evaluates the partitioned hyper-graph based on at least one of one or more partitioning constraints and one or more partitioning effect metrics, repartitions the partitioned hyper-graph when warranted by the evaluation step, and generates a mapping based on the partitioned hyper-graph that assigns at least one or more portions of the database to the one or more nodes.

Advantageously, database partitioning embodiments described herein reduce the heavy overhead of distributed transactions, especially when dealing with many-to-many relationships or very complex database schemas such as those involved in OLTP database systems. While data skew and workload skew are known to degrade the performance of overloaded nodes and thereby lower overall system throughput, database partitioning embodiments described herein achieve both data and workload balancing, while reducing or preventing violation of operational constraints on the cluster configuration, such as node storage capacities, node processing ability, and network bandwidth between nodes.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

Illustrative embodiments of the invention provide an iterative and interactive fine-grained hyper-graph based database partitioning system designed for OLTP workloads, which is referred to herein as a hyper-graph based OLTP database partitioning engine (or simply "the database partitioning engine" or "the engine").

Figure 1:
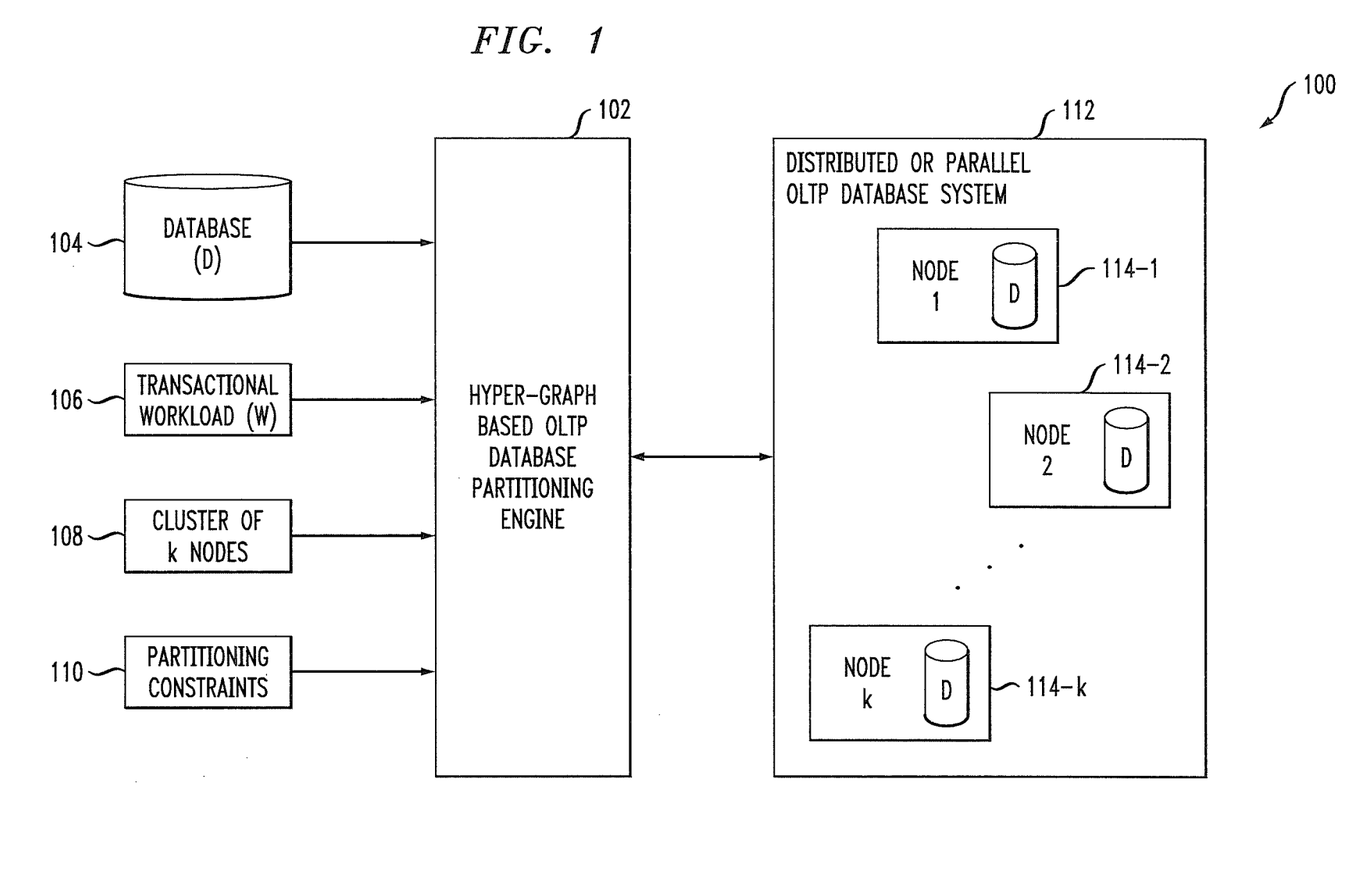
FIG. 1 illustrates a data processing system environment with a database partitioning engine in accordance with one embodiment of the invention.

FIG. 1 illustrates a data processing system environment 100 with a database partitioning engine in accordance with one embodiment of the invention. As shown, given specification of a database 104 (D), a transactional workload 106 (W), a cluster of k nodes 108 and one or more partitioning constraints 110, a hyper-graph based OLTP database partitioning engine 102 (the database partitioning engine or the engine) efficiently derives a partitioning scheme which replicates and distributes D over the k nodes (represented as 114-1 through 114-k) to form a distributed or parallel OLTP database system 112. The database partitioning engine 102 tries to minimize the number of distributed transactions in W as well as the partition skew and the workload skew at the nodes that results from the partitioning of D. In addition, for the partitioning of D to be feasible, it should not violate the one or more partitioning constraints 110, e.g., physical constraints C that are imposed by the underlying node cluster, e.g. the node storage capacities.

As used herein, the term "skew" refers to a measure of asymmetry of a given distribution. Thus, partition skew is a measure of asymmetry of a distribution associated with a database partitioned across a distributed system, while workload skew is a measure of asymmetry of a distribution of workload across the distributed system. It is realized that distributed transactions and partition skew and workload skew are the major performance bottlenecks of OLTP database systems.

As will be explained in detail herein, the high efficiency and effectiveness of the database partitioning engine 102 is due, at least in part, to its hyper-graph based, iterative and interactive approach. That is, the engine is built on top of a hyper-graph based database partitioning model, which is able to minimize the number of distributed transactions as well as the extent of partition and workload skew during the workload execution. The engine applies the iterative hyper-graph based database partitioning in order to achieve better partitioning quality, save the user's time spent on partitioning design and increase its application scenes. The engine is also highly interactive, as it provides rich opportunities for the user to help further improve the partitioning quality by passing expertise and indirect domain knowledge.

Figure 2:
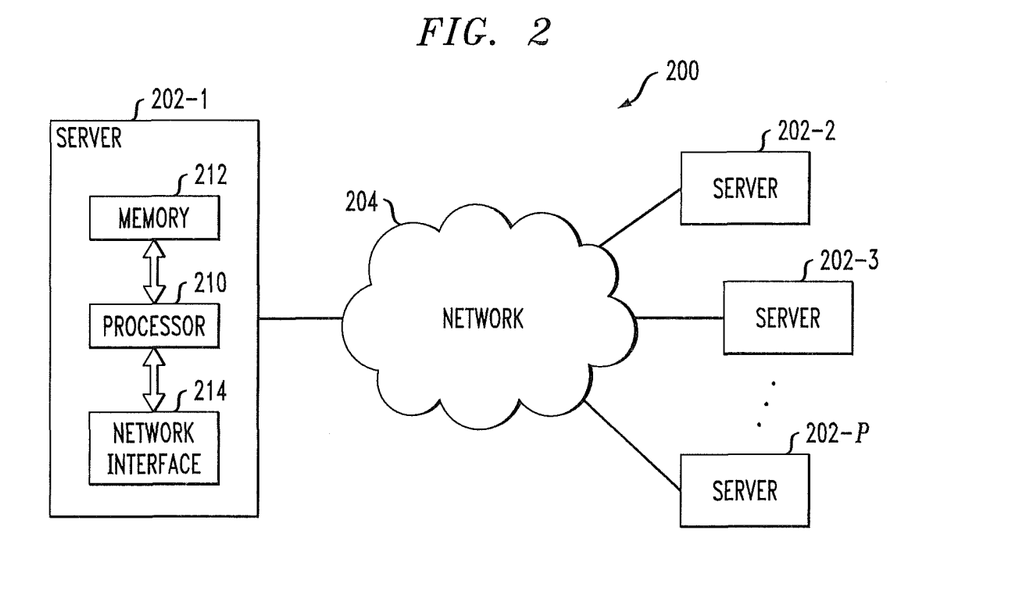
FIG. 2 illustrates a processing platform on which the data processing system environment with a database partitioning engine of FIG. 1 is implemented in accordance with one embodiment of the invention.

FIG. 2 illustrates a processing platform 200 on which the data processing system environment 100 with the database partitioning engine 102 of FIG. 1 is implemented in accordance with one embodiment of the invention. The processing platform 200 in this embodiment comprises a plurality of servers, denoted 202-1, 202-2, 202-3, . . . 202-P, which communicate with one another over a network 204. The various elements shown in FIG. 1 may therefore be respectively executed on all or a subset of the servers 202-1 through 202-P, or on other computers or other processing platform elements, which may each be viewed as an example of what is more generally referred to herein as a "processing device." As illustrated in FIG. 2, such a device generally comprises at least one processor and an associated memory, and implements one or more functional modules for controlling certain features of data processing system environment 100. It is to be appreciated that multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of data processing system environment 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 200 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Furthermore, it is to be appreciated that the data processing system environment 100 of FIG. 1 can comprise virtual machines (VMs) implemented using a hypervisor. A hypervisor is an example of what is more generally referred to herein as "virtualization infrastructure." The hypervisor runs on physical infrastructure. As such, the database partitioning techniques illustratively described herein can be provided as one or more cloud services. The cloud services thus run on respective ones of the virtual machines under the control of the hypervisor. Data processing system environment 100 may also include multiple hypervisors, each running on its own physical infrastructure. Portions of that physical infrastructure might be virtualized.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the data processing system environment 100 in one or more embodiments of the invention is the VMware® vSphere™ which may have an associated virtual infrastructure management system such as the VMware® vCenter™. The underlying physical infrastructure may comprise one or more distributed processing platforms that include storage products such as VNX and Symmetrix VMAX, both commercially available from EMC Corporation of Hopkinton, Mass. A variety of other computing and storage products may be utilized to implement at least a portion of the cloud services.

Illustrative details of the database partitioning engine 102 will now be described with reference to FIGS. 3 through 7.

Figure 3:
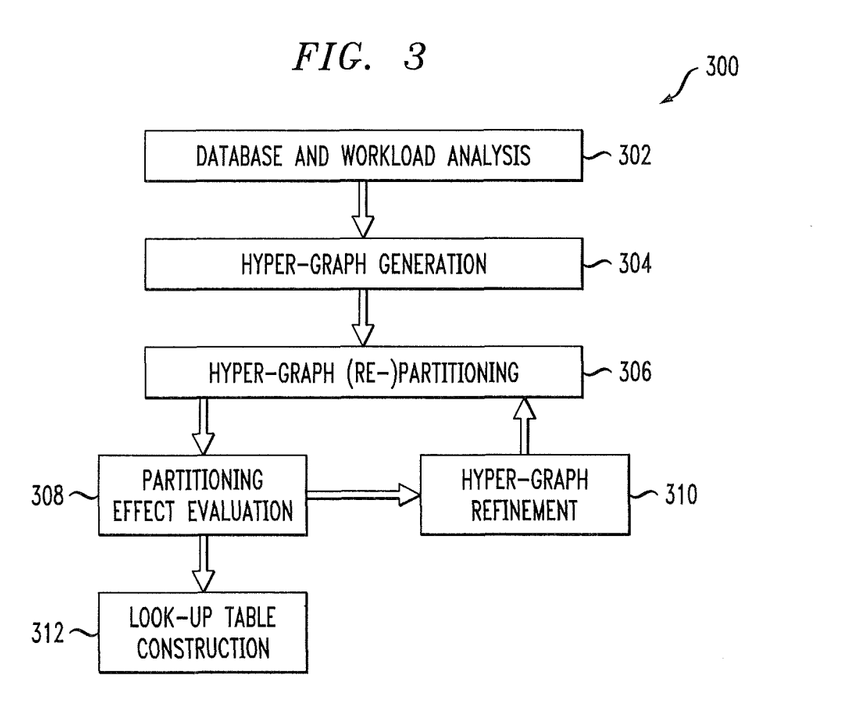
FIG. 3 illustrates a database partitioning methodology in accordance with one embodiment of the invention.
Figure 4:
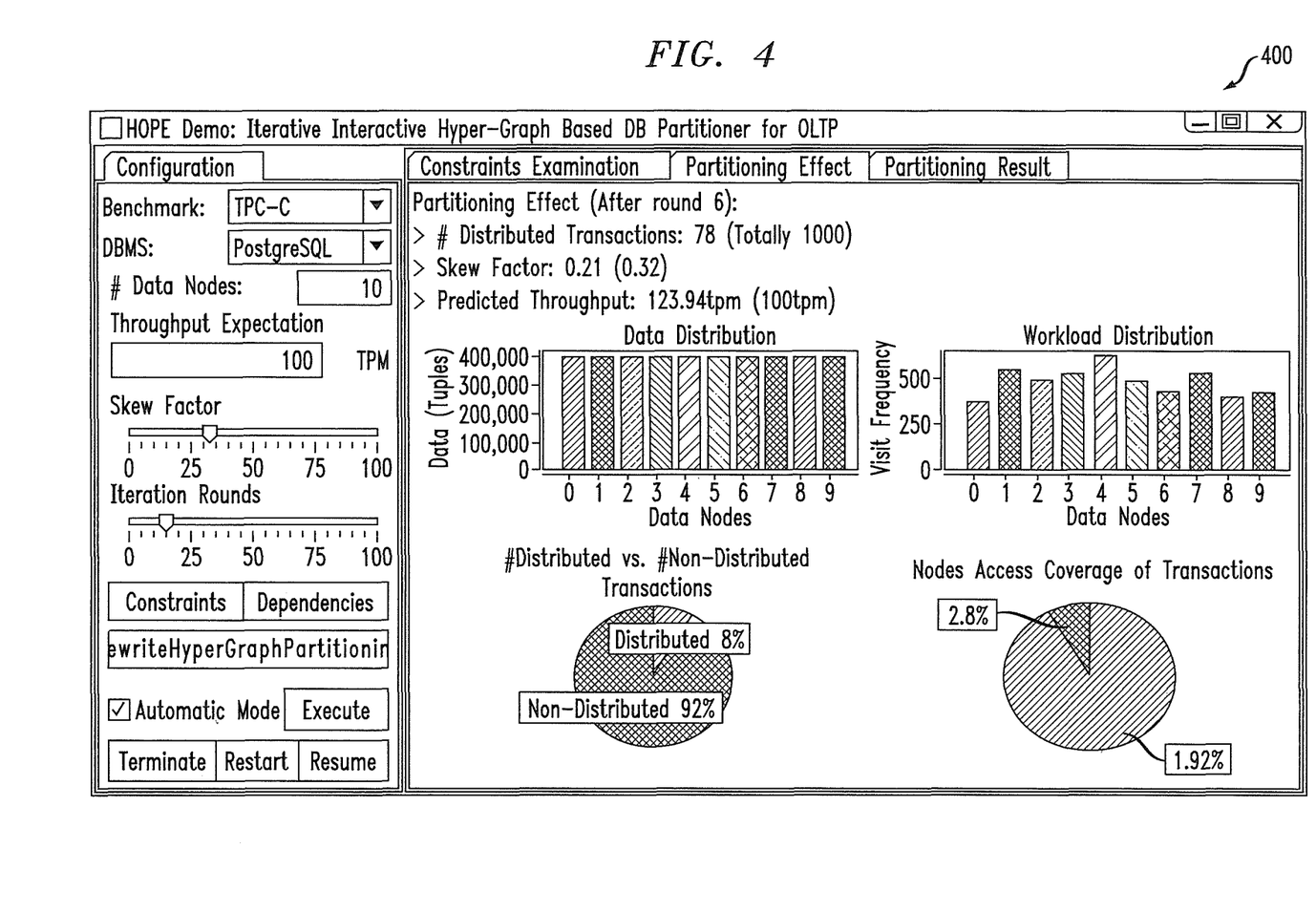
FIG. 4 illustrates a graphical user interface in accordance with one embodiment of the invention.

FIG. 3 illustrates a database partitioning methodology 300 in accordance with one embodiment of the invention. That is, methodology 300 is one example of a methodology employed by the database partitioning engine 102 of FIG. 1.

Recall that inputs to the database partitioning engine 102 include a database, a representative transactional workload (e.g., a trace of structured query language (SQL) queries), a node cluster and partitioning constraints (e.g., imposed by users and/or the computing environment). The database partitioning problem is modeled by the database partitioning engine 102 as a hyper-graph partitioning problem. The database partitioning engine 102 first analyzes the database and workload and constructs a weighted hyper-graph. The engine then runs an iterative and interactive hyper-graph partitioning process to obtain a feasible and near-optimal (substantially optimal) partitioning scheme, where each partition of the hyper-graph is assigned to one single node of the distributed or parallel OLTP database system 112. The final output is a partitioning design which indicates how the database should be partitioned and distributed over the cluster of nodes 114-1 through 114-k.

In the embodiment of FIG. 3, the methodology 300 comprises six main steps: database and workload analysis 302; hyper-graph generation 304; hype-graph partitioning (re-partitioning) 306; partitioning effect evaluation 308; hyper-graph refinement 310; and look-up table construction 312. Each step will now be described in detail.

The database and workload analysis step 302 virtually decomposes each table in the database into one or multiple tuple groups, according to the contextual information extracted from the workload and provided by the user. The tuples within each group are accessed together throughout the whole workload execution. Step 302 derives the tuple group sizes based on database metadata and statistics stored in a DBMS catalog. Step 302 also examines the correlations between tuple groups and transactions in order to know how many times each tuple group is accessed by transactions, and how many transactions access a specific set of tuple groups.

The hyper-graph generation step 304 is responsible for constructing the initial hyper-graph that will be fed into the iterative hyper-graph partitioning processing, where each tuple group becomes a distinct vertex and each transaction is mapped to a hyper-edge. An example of a hyper-graph and its partitioning will be given below in the context of FIG. 6. Step 304 utilizes intelligent algorithms to choose a subset of promising tuple groups for replication, where these tuples groups are corresponding to multiple vertices. Meanwhile, step 304 also accepts suggestions from the user on the selection of replicated tuple groups.

The iterative hyper-graph partitioning processing is actually handled together in three steps: hyper-graph (re)partitioning 306, partitioning effect evaluation 308 and hyper-graph refinement 310, which in turn run until reaching the terminal conditions. During each iteration, a hyper-graph is first partitioned by hyper-graph (re)partitioning step 306 and the partitioning effect is evaluated by partitioning effect evaluation step 308. After that, this hyper-graph is refined into a new hyper-graph by hyper-graph refinement step 310, which will be fed into the next iteration.

The hyper-graph (re)partitioning step 306 partitions a hyper-graph that is either the initial one passed from the hyper-graph generation step 304 during the first iteration, or a refined one passed from the preceding iteration. In the latter case, step 306 computes the partitioning incrementally based on the partitioning result of the preceding iteration. Besides, step 306 also supports incrementally repartitioning the same hyper-graph according to updated partitioning constraints, in order to facilitate what-if question answering. In one embodiment, hyper-graph processing can be adapted from the hMETIS algorithm developed by Karypis Labs of Minneapolis, Minn. for VLSI circuit design. However, one or more other hyper-graph processing algorithms may be employed in and/or adapted for alternative embodiments.

The partitioning effect evaluation step 308 first checks whether the resulting database partitioning violates the imposed constraints. Step 308 then generates reports on multiple partitioning effect metrics, e.g., skews of partition and workload distribution, the number of distributed transactions, as well as the predicted system throughput and response latency. Step 308 may also visualize both partitioning result and effect for more intuitive user investigation.

The hyper-graph refinement step 310 modifies a hyper-graph by selecting a subset of tuple groups for splitting. The modified hyper-graph is fed to hyper-graph (re)partitioning step 306. Step 310 picks tuple groups to split according to given criteria. The hyper-edges are then adjusted accordingly. Moreover, step 310 also accepts suggestions from the user on tuple group splitting.

The look-up table construction step 312 encodes the final database partitioning design into a look-up table, which records the tuple-to-node mappings via a compact data structure representation. This look-up table is used when both loading the database into the cluster and routing transactions to involved data nodes during workload execution.

Given the overall methodology described above in the context of FIG. 3, we now give illustrative detailed descriptions of the underlying hyper-graph based database partitioning model and the methodology. We formalize the transactional database partitioning problem as follows: Given a database D, a transactional workload W and a cluster of k nodes including the physical constraints C imposed on, find a partitioning scheme that replicates and distributes D over the k nodes, where the number of distributed transactions in W as well as the partition and workload skews at the nodes are minimized and all the physical constraints are not violated.

Tuple Group

According to W, each table in D can be divided into one or multiple tuple groups, where tuples in each group are always accessed together throughout the execution of W.

In one example each tuple group is essentially represented by a valid min-term predicate. Given a table T and its attribute A, a simple predicate p defined on T has the form:

p:AΘconst where const is a constant and $\theta \in \{=, <, \neq, >, \leq, \geq\}$. Given the set of simple predicates $P=\{p_1, p_2, \ldots, p_n\}$ defined on a table T of D by W, a min-term predicate M is defined as:

$M = p_1^* \char`\^ p_2^* \ldots \char`\^ p_n^*$ where $p_i^* = p_i$ or $\neg p_i (1 \leq i \leq n)$. M is valid only if it does not contain contradicting simple predicates. M may be empty due to data skew and (soft) functional dependencies.

Hyper-Graph Partitioning Modeling

The database partitioning engine 102 handles the database partitioning by modeling it as a hyper-graph partitioning problem, where tuple groups are treated as the minimum units for replication and distribution.

A hyper-graph extends the normal graph definition so that an edge can connect any number of vertices. In database partitioning engine 102, a hyper-graph HG(V,E) is constructed as follows. D is decomposed into non-empty tuple groups $\{M_i\}$ as described above. Each tuple group $M_i$ corresponds to a distinct vertex $v_i \in V$. $v_i$ has two weights: $s(v_i)$ which is the size of tuple group $M_i$, and $a(v_i)$ which is the times that transactions in W access $M_i$.

Each transaction in W is mapped to a hyper-edge $e_i \in E$ that connects all the tuple groups it accesses. It is possible for different transactions to access the same tuple groups and thus to be mapped to the same hyper-edge. Note that $e_i$ has a weight $c(e_i)$ counting the number of transactions mapped to it.

Tuple groups in D could be replicated so as to reduce distributed read-only or read-heavy transactions. Suppose that a set X of transactions in W have read-only accesses to a tuple group M chosen for replication. Then M will have |X| replicas, each of which is dedicated to a distinct transaction in X and becomes a distinct vertex in HG. Moreover, the transactions updating M will now access all the |X| replicas of M, and thus their mapping hyper-edges in HG will connect all the vertices corresponding to the replicas of M.

The database partitioning engine 102 partitions the hyper-graph HG into k disjoint sub-graphs. The tuple groups in each sub-graph will be assigned to a distinct cluster node. After the partitioning, each hyper-edge e spanning more than one sub-graph is cut and incurs c(e) distributed transactions, since the tuple groups accessed by the transactions mapped to e will be placed into at least two nodes. As a result, the total number N of resulting distributed transactions in W is equal to the sum of the weights of the cut hyper-edges. As such, the database partitioning engine 102 seeks to derive a min-cut k-way partitioning of HG in order to minimize N.

In the meantime, the physical properties of the cluster, e.g., node storage capacities, are modeled as constraints to be imposed on the k-way partitioning of HG.

In addition, a skew factor SF is defined to quantitatively measure the extent of partition and workload skews. A preset value of SF is also used to constrain the k-way partitioning of HG. For the $i^{th}$ node, $1 \leq i \leq k$, let $s_i$ and $t_i$ be the size of the database partition assigned to it and the number of transactions accessing it respectively. Note that $s_i$ and $t_i$ can be derived from the two vertex weights. SF is thereby calculated as:

$$SF = \frac{\sum_{i=1}^{k}\left(\alpha \times \left(s_i - \frac{1}{k} \times \sum_{i=1}^{k} s_i\right)^2 + \beta \times \left(t_i - \frac{1}{k} \times \sum_{i=1}^{k} t_i\right)^2\right)}{k}$$

where $\alpha$ and $\beta$ are non-negative parameters ($\alpha+\beta=1$) used to reflect the difference between partition skew and workload skew on their impacts on the system performance. Generally, a smaller value of SF means better system load-balancing.

Iterative and Interactive Hyper-Graph Partitioning

The processing of hyper-graph partitioning by the database partitioning engine 102 is both iterative and interactive.

At the beginning, an initial hyper-graph $G_0$ is constructed from W and D, as described above. The user may input contextual information that is beneficial to $G_0$ but not directly inferable from W and D. For example, the (soft) functional dependencies existing between attributes can be used to identify empty tuple groups; the user may have good sense on the selection of tuple groups for replication.

After $G_0$ is constructed, the iterative hyper-graph partitioning functions as follows. During an iteration, a hyper-graph $G_i (i \geq 0)$ is partitioned and the partitioning effect is evaluated. Subsequently, a new hyper-graph $G_{i+1}$ is refined from $G_i$ by splitting some tuple groups in $G_i$, and will be fed into the next iteration. Essentially, $G_{i+1}$ represents a partitioning search space properly subsuming that of $G_i$, and thus enables better partitioning effect, i.e., fewer distributed transactions and/or better load balancing. Moreover, the partitioning of $G_{i+1}$ can be done incrementally based on the partitioning result of $G_i$. The iterative procedure repeats until the resulting partitioning effect converges, the number of finished iterations reaches a preset value, or it is terminated by the user.

Iterative hyper-graph partitioning is designed for rich user interactions and additional application scenes of the database partitioning engine 102.

Between two consecutive iterations, the user may examine the current partitioning result and provide useful suggestions on the hyper-graph refinement, i.e., tuple group splitting. As such, the user is kept in the loop of partitioning decision making and helps to improve the final partitioning quality by passing expertise and indirect domain knowledge.

Iterative partitioning accelerates the arrival of a "good enough" (sufficient) partitioning result. The user may have some expectation on the partitioning effect, e.g., the lowest system throughput and/or the highest latency that will satisfy the user. Once the partitioning result of a specific iteration meets the user expectation, the user can choose to immediately terminate the whole partitioning processing, instead of waiting to the end. Such early termination increases the partitioning efficiency, especially when the hyper-graphs are huge and dense due to complicated database schema and workload.

Iterative partitioning also enables the application of the database partitioning engine 102 in scenarios in addition to finding the optimal partitioning strategy with respect to a static database, workload and cluster configuration.

Consider a scenario where the user wants to minimize the TCO (total cost of ownership) of the cluster, and at the same time keep the partitioning effect at a stable level. This scenario frequently happens to, for example, Web services providers like Dropbox who rent clusters from public clouds like EC2. Here the database partitioning engine 102 can be utilized to efficiently answer the what-if questions asked either by the user or by some automatic searching algorithm: is the expected partitioning effect achievable given a specific cluster configuration? On the one hand, with the database partitioning engine 102, the user can quickly identify the point (i.e., iteration) where the expected partitioning effect is just achieved, or judge in time that the expected partitioning effect is unreachable after enough iterations. On the other hand, the hyper-graph partitioning algorithm utilized by the database partitioning engine 102 can incrementally revise an already partitioned hyper-graph according to new constraints, which means that, after the engine answers a what-if question and stops at some iteration, it can proceed to answer the next what-if question without restarting from the first iteration.

Tuple Group Generation

In one embodiment of a process, the steps for obtaining the tuple groups, i.e., min-term predicates, for each table T are as follows.

First, the process extracts all the simple predicates related to table T in the workload. Second, the process constructs the min-term predicates list by enumerating the conjunctions of all the simple predicates of either normal or negated form. Third, the process eliminates those min-term predicates containing contradicting simple predicates, and simplifies the min-term predicates by removing the simple predicates that are implied by other simple predicates within the same min-term predicate.

In order to control the number of min-term predicates generated, the process could only select the top-$k_a$ mostly accessed attributes of each relation for min-term predicate construction. Note that $k_a$ is configurable by the user and currently has a default value of 2.

The process obtains the database meta-data and statistics information (e.g., histograms) from the underlying database system catalog, and then estimates s(M) of a min-term predicate with methods, for example, similar to those utilized by a conventional relational database optimizer.

To obtain the access count a(M) of a min-term predicate, the process examines each transaction in the workload and determines whether it accesses the tuple group M. A transaction x will access the tuple group M if for each attribute a of table T, the set of simple predicates on a that are involved by x do not contradict with M. Then c(M) is equal to the total number of transactions accessing the tuple group M.

Hyper-Graph (Re-)Partitioning

In one embodiment, as mentioned above, the database partitioning engine 102 may adapt and employ the hMETIS partitioning algorithm to assist in the hyper-graph partitioning. Note that hMETIS will tell which vertex belongs to which node, and also the sum of weights of the net cut, which represents the number of distributed transactions that would be incurred by this partitioning solution. Embodiments of the invention modify hMETIS to support incrementally revising an already partitioned hyper-graph according to new constraints. This feature enables lighter-weight hyper-graph repartitioning after the hyper-graph refinement.

Partitioning Effect Report

The partitioning effect evaluation generates predictions on multiple performance metrics: data distribution, workload distribution, the number of distributed transaction, as well as the system throughput and response latency, which can be obtained by the simulated execution of the workload. These results and effects are visualized, after each iteration, for more intuitive user investigation, as shown in the exemplary graphical user interface (GUI) 400 of FIG. 4. Note that GUI 400 is one example of a display screen of a user interface implemented by the database partitioning engine 102.

User Interaction

The database partitioning engine 102 provides rich opportunities for the user to interact with and exert a positive impact on the whole system execution. The following interaction points are provided throughout the full execution cycle in the engine.

Figure 5:
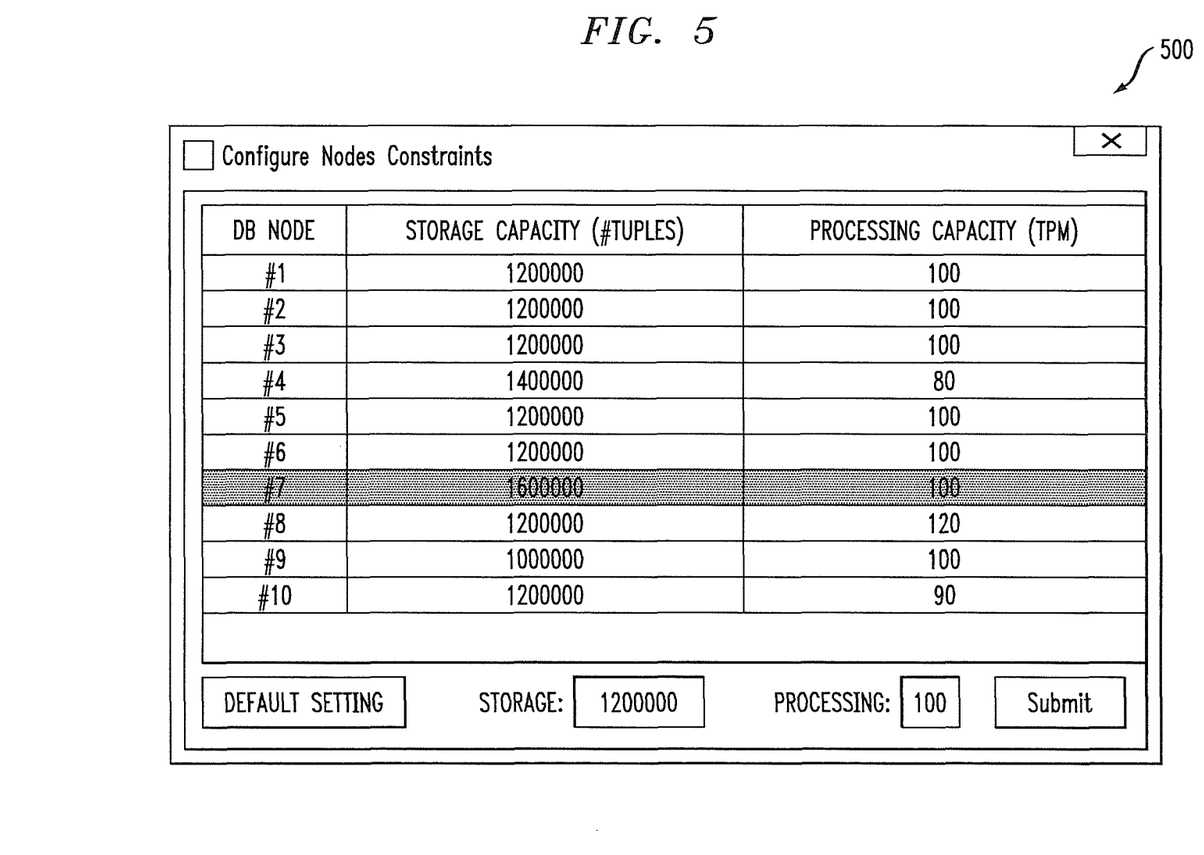
FIG. 5 illustrates a configuration table in accordance with one embodiment of the invention.
Figure 6:
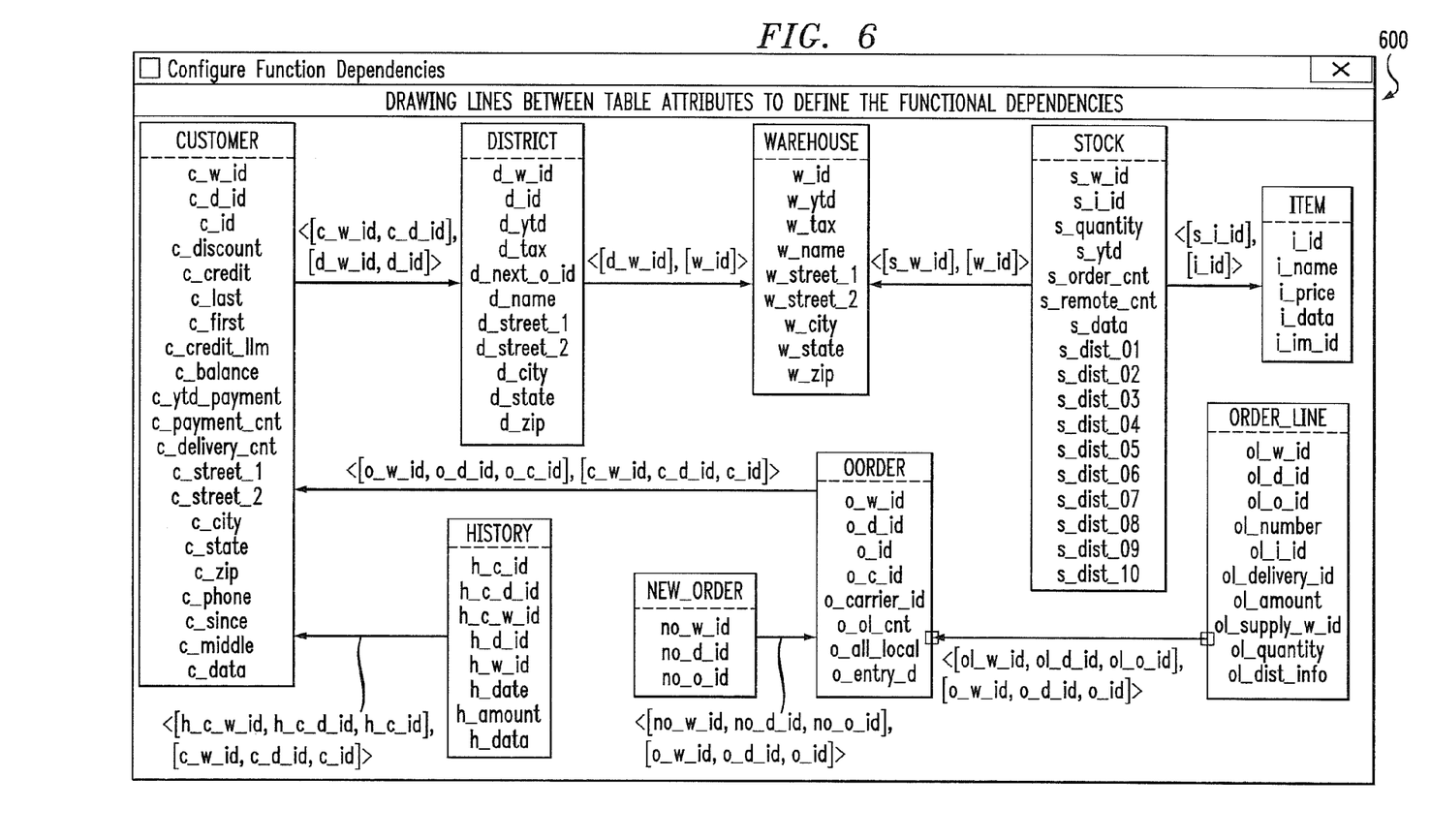
FIG. 6 illustrates a functional dependency configuration in accordance with one embodiment of the invention.

In the system configuration phase, the user can provide the database partitioning engine 102 the storage and processing capacity constraints imposed on the nodes in the form of configuration table, such as the exemplary table shown in display screen 500 in FIG. 5. In addition, the user can provide a system throughput value with which the user will be satisfied, and the largest skew factor the user will tolerate. Moreover, the user can provide the maximum number of partitioning iterations for the engine to traverse.

Before the iterative hyper-graph partitioning starts, the user can provide the parameter $k_a$ to indicate the top-$k_a$ attributes of each table to construct the tuple groups. The user may directly appoint these attributes for each table to correct the improper ones when the engine exhibits all the chosen attributes. The user can also provide the engine with implicit functional dependencies between table attributes, which help the engine to identify and eliminate some empty tuple groups in the initial hyper-graph. The engine 102 analyzes and visualizes the database schema, and then the user can draw a line between table attributes to define a functional dependency, as shown in the display screen 600 in FIG. 6. The engine 102 by default replicates the read-only and read-mostly tuple groups, but the user can also directly choose the appropriate ones to instruct the engine to replicate.

Between two consecutive iterations, the user may examine the current partitioning result and provide useful suggestions on the hyper-graph refinement based on his/her expertise and indirect domain knowledge, i.e., tuple group splitting. The user can provide the proper parameter $k_v$ to indicate that the top-$k_v$ vertices should be split. The user can also directly select the most important tuple groups to split.

The engine 102 also implements an early termination interface. When the predicated system throughput meets the user's expectation or the user sees a hopelessly bad result, the user can choose to early terminate the iteration processing.

Hyper-Graph Refinement

The hyper-graph refinement modifies a hyper-graph by selecting a subset of tuple groups for splitting according to certain criteria. The process steps are as follows. First, the process ranks the vertices with a ranking function. Vertices with higher ranks are more likely to be split. Currently, the process uses the vertex size as the ranking function. Alternative rank functions, e.g., the ratio of size and access frequency, may also be utilized.

Second, the process selects the top-$k_v$ vertices to split. Note that $k_v$ is configurable by the user and illustratively has a default value of 20.

Third, the process splits each selected vertex v into two new vertices $v_1$ and $v_2$. The process selects the simple predicate p with the lowest selectivity in the min-term predicate M of v and then breaks p into two simple sub-predicates, $p_1$ and $p_2$, with the same selectivity. Note that $v_1$ and $v_2$ correspond to the new min-term predicates constructed by replacing p in M with $p_1$ and $p_2$ respectively. A hyper-edge accesses $v_1$ and $v_2$ if it accesses v. As a result, $s(v_1)=s(v_2)=s(v)/2$ and $a(v_1)=a(v_2)=a(v)$.

The refined hyper-graph contains finer-grained vertices and represents a larger partitioning search space, which may enable feasible partitioning solutions as well as better partitioning effect, i.e., fewer distributed transactions and/or better load balancing.

Figure 7:
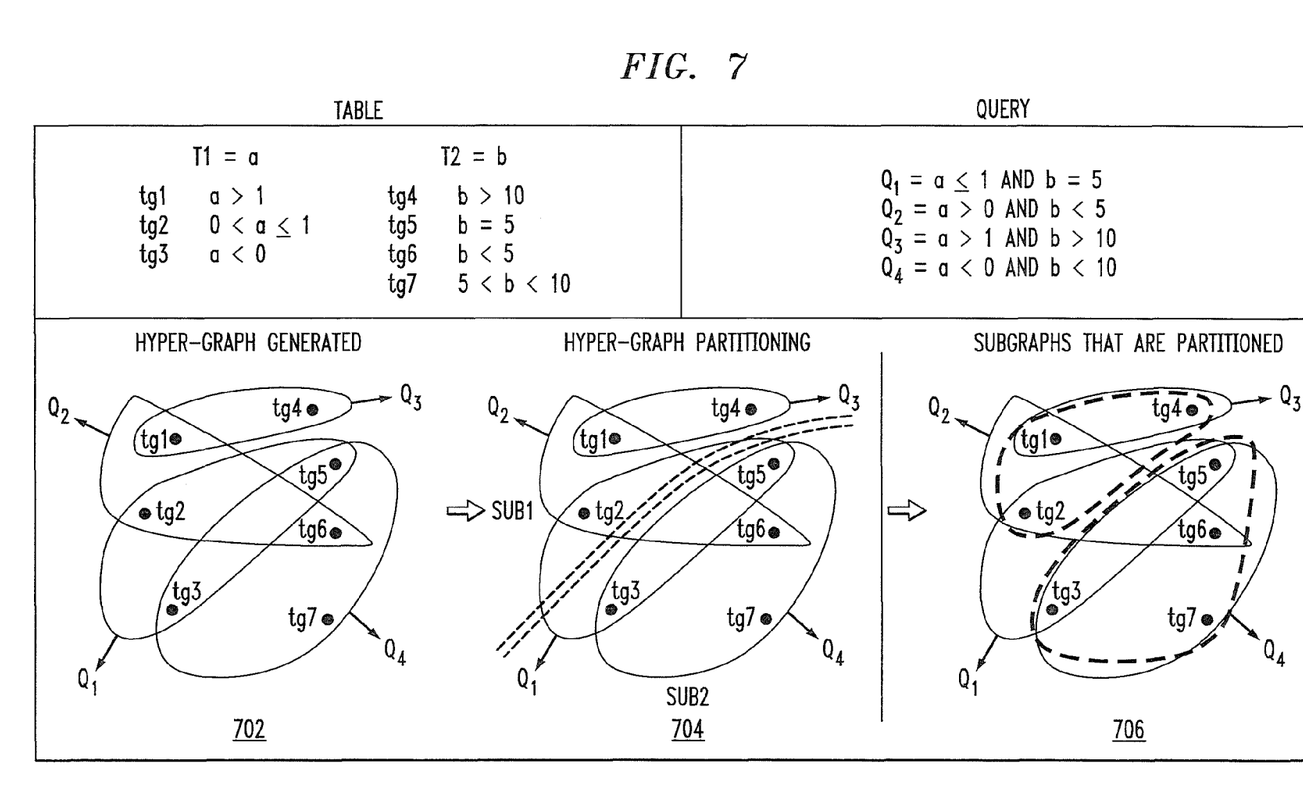
FIG. 7 illustrates examples of a hyper-graph, a partitioned hyper-graph and sub-graphs in accordance with one embodiment of the invention.

FIG. 7 illustrates examples of a hyper-graph, a partitioned hyper-graph and sub-graphs in accordance with one embodiment of the invention. It is to be appreciated that these graphs are generated by the database partitioning engine 102 using the methodologies described above. However, this is merely one example used to illustrate the methodologies and intended to be non-limiting.

As shown in FIG. 7, assume that there are two tables: T1 and T2, and T1 has attribute a, T2 has b. Assume also that the workload has four queries: Q1-Q4. According to this workload, we can split table T1 and T2 into seven tuple groups: tg1 through tg7. T1 has three tuple groups (tg1, tg2 and tg3) and T2 has four tuple groups (tg4, tg5, tg6 and tg7). This is as shown in top portion of FIG. 7. Then, the hyper-graph generated is shown as 702, wherein each region represents a hyper-edge, e.g., the hyper-edge of Q4 includes four vertices: tg3, tg5, tg6, tg7.

Assume graph 702 is partitioned into two parts, as shown in partitioned graph 704, where Q1 and Q2 are cut as per the double-dashed line. Then the partitioned sub-graphs are shown in 706, where sub-graph 1 includes tg1, tg2 and tg4, and sub-graph 2 includes tg3, tg5, tg6 and tg7.

The hyper-graph based OLTP database partitioning methodologies described herein provide many advantages over conventional approaches. By way of one example, the hyper-graph based OLTP database partitioning engine provides fine-grained and effective partitioning designs and thus works well for all kinds of transactional workloads. The engine handles the database partitioning by modeling it as a hyper-graph partitioning problem, where tuple groups are treated as the minimum units for replication and distribution. Tuple groups cluster tuples that are accessed together throughout the workload execution. As a result, compared with the conventional round-robin, range and hash partitioning methods, the hyper-graph based database partitioning often leads to a fewer number of distributed transactions.

By way of another example, the hyper-graph based OLTP database partitioning engine is very light-weight and efficient. The engine is more efficient and scalable than conventional partitioning schemes, as the size of the hyper-graph depends only on the complexities of database schema and workload, rather than the database size. Besides, unlike the previous approaches, the hyper-graph based approach does not need to interact with a query optimizer for cost estimation, whose overhead is quite significant. The implementation of incremental hyper-graph repartitioning also makes the engine efficient and allows it to quickly obtain final partitioning results.

By way of yet another example, the hyper-graph based OLTP database partitioning engine is a highly interactive database partitioning system. The engine provides rich opportunities for the user to interact with and exert a positive impact on the system execution. In this fashion, the engine is particularly attractive for at least the following reasons: the user retains control over the performance-critical decisions; in the meantime the power of automated computation is further amplified by human intelligence. The engine allows the expertise and indirect domain knowledge of the user, e.g., good sense on the choice of tuple group replication and useful suggestions on the hyper-graph refinement, to be passed into the engine so as to further improve the final partitioning quality.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
 analyzing a database and a workload set associated with the database;
 generating a hyper-graph based on the analysis of the database and the workload set;
 partitioning the hyper-graph into a partitioned hyper-graph;
 evaluating the partitioned hyper-graph based on at least one of one or more partitioning constraints and one or more partitioning effect metrics;
 repartitioning the partitioned hyper-graph when warranted by the evaluation step; and
 generating a mapping based on the partitioned hyper-graph that assigns at least one or more portions of the database to one or more nodes of a data processing system;
 wherein the analyzing, hyper-graph generating, partitioning, evaluating, repartitioning and mapping generation steps are executed via at least one processor device.

2. The method of claim 1, wherein the step of analyzing the database and the workload set associated with the database further comprises decomposing each table in the database into one or more tuple groups based on information extracted from the workload set.

3. The method of claim 2, wherein the step of analyzing the database and the workload set associated with the database further comprises identifying correlations between the tuple groups and transactions in the workload set.

4. The method of claim 3, wherein the step of generating the hyper-graph based on the analysis of the database and the workload set further comprises:
 assigning a tuple group to a vertex of the hyper-graph; and
 assigning a transaction to a edge of the hyper-graph.

5. The method of claim 4, wherein one or more tuple groups are selected for replication and thus correspond to multiple vertices.

6. The method of claim 4, wherein the step of partitioning the hyper-graph into the partitioned hyper-graph further comprises partitioning the hyper-graph into multiple disjoint sub-graphs.

7. The method of claim 6, wherein the step of partitioning the hyper-graph into the partitioned hyper-graph further comprises cutting each edge spanning a first sub-graph and a second sub-graph.

8. The method of claim 6, wherein the partitioning of the hyper-graph into the multiple disjoint sub-graphs is based on operational constraints associated with the one or more nodes of the data processing system.

9. The method of claim 6, wherein the partitioning of the hyper-graph into the multiple disjoint sub-graphs is based on a skew factor that represents a quantitative measure of the extent of partition and workload skews.

10. The method of claim 1, wherein the step of evaluating the partitioned hyper-graph based on at least one of one or more partitioning constraints and one or more partitioning effect metrics further comprises determining whether the partitioned hyper-graph violates the one or more partitioning constraints and meets the one or more partitioning effect metrics.

11. The method of claim 10, wherein the step of evaluating the partitioned hyper-graph based on at least one of one or more partitioning constraints and one or more partitioning effect metrics further comprises visualizing a correspondence between the partitioned hyper-graph and an evaluated effect of the partitioned hyper-graph.

12. The method of claim 4, wherein the step of repartitioning the partitioned hyper-graph when warranted by the evaluation step further comprises splitting a selected subset of tuple groups to form a repartitioned hyper-graph.

13. The method of claim 12, wherein the step of repartitioning the partitioned hyper-graph when warranted by the evaluation step further comprises receiving user input for selection of the subset of tuple groups to be split.

14. The method of claim 1, wherein the step of generating the mapping based on the partitioned hyper-graph that assigns at least one or more portions of the database to one or more nodes of the data processing system further comprises generating a look-up table that records a tuple-to-node assignment.

15. The method of claim 14, further comprising loading that database into the nodes of the data processing system based on the tuple-to-node assignment.

16. The method of claim 14, further comprising routing transactions associated with the workload set to nodes of the data processing system based on the tuple-to-node assignment during execution of the workload set.

17. The method of claim 1, wherein the data processing system comprises an online transaction processing database system.

18. A computer program product comprising a processor-readable storage medium having encoded therein executable code of one or more software programs, wherein the one or more software programs when executed by the at least one processor device implement the steps of the method of claim 1.

19. An apparatus comprising:
a memory; and
at least one processor device operatively coupled to the memory and configured to:
analyze a database and a workload set associated with the database;
generate a hyper-graph based on the analysis of the database and the workload set;
partition the hyper-graph into a partitioned hyper-graph;
evaluate the partitioned hyper-graph based on at least one of one or more partitioning constraints and one or more partitioning effect metrics;
repartition the partitioned hyper-graph when warranted by the evaluation step; and
generate a mapping based on the partitioned hyper-graph that assigns at least one or more portions of the database to one or more nodes of a data processing system.

20. An online transaction processing database system comprising:
a database;
one or more nodes; and
a database partitioning engine coupled to the one or more nodes and configured to determine a distribution of the database across the one or more nodes by:
analyzing the database and a workload set associated with the database;
generating a hyper-graph based on the analysis of the database and the workload set;
partitioning the hyper-graph into a partitioned hyper-graph;
evaluating the partitioned hyper-graph based on at least one of one or more partitioning constraints and one or more partitioning effect metrics;
repartitioning the partitioned hyper-graph when warranted by the evaluation step; and
generating a mapping based on the partitioned hyper-graph that assigns at least one or more portions of the database to the one or more nodes.

* * * * *